C. A. WHITE & F. McLAUGHLIN.
RESILIENT HUB FOR WHEELS.
APPLICATION FILED MAR. 9, 1912.
1,040,599.
Patented Oct. 8, 1912.
2 SHEETS—SHEET 1.
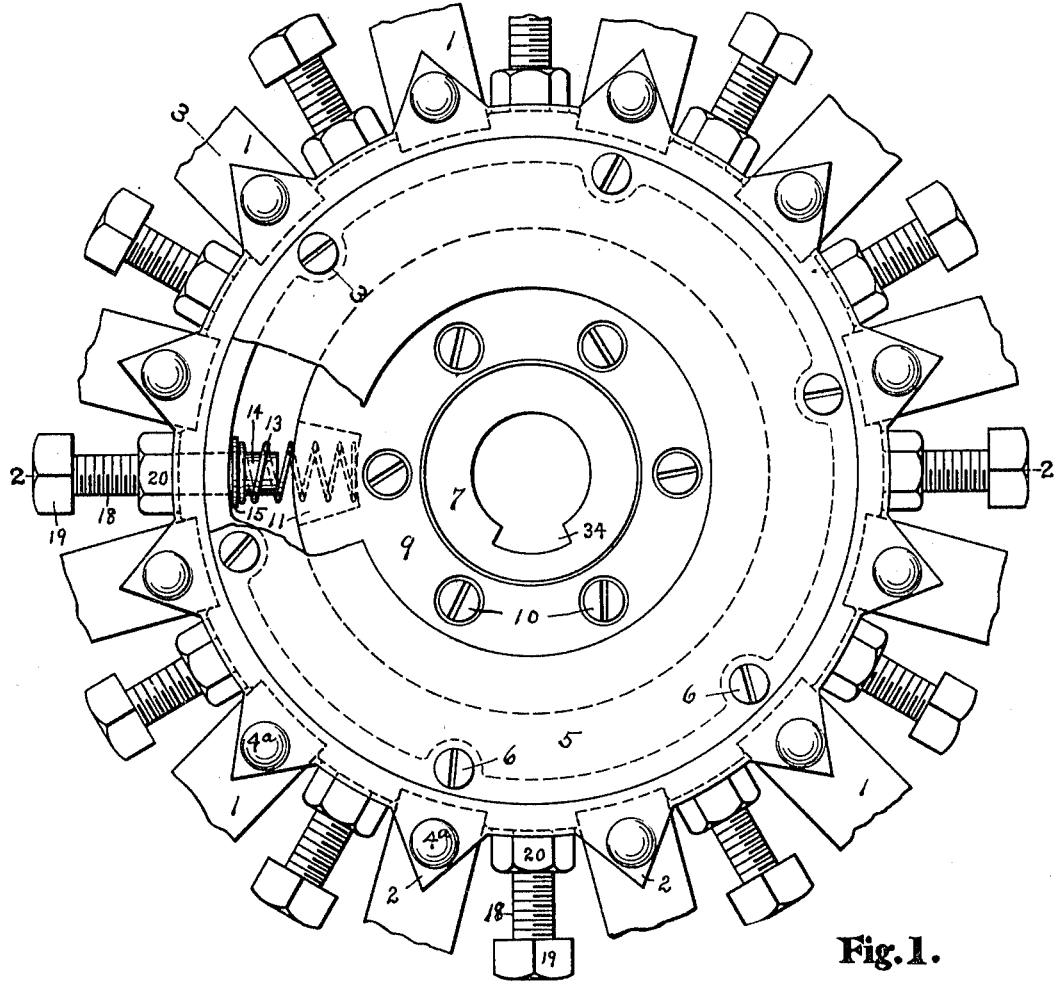
Fig. 1.
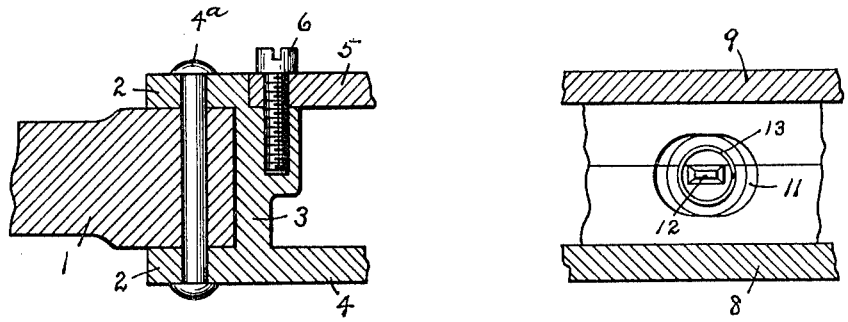
Fig. 3.
Fig. 4.
Witnesses
Albert A. Hofmann
H. W. Kreinbring
Inventors
Charles A. White and
Frank McLaughlin,
By Edward N. Pagelsen,
Attorney C. A. WHITE & F. McLAUGHLIN.
RESILIENT HUB FOR WHEELS.
APPLICATION FILED MAR. 9, 1912.

1,040,599.

Patented Oct. 8, 1912.

2 SHEETS—SHEET 2.

Witnesses
Albert A. Hofmann
H. W. Kreinbring.

Inventors
Charles A. White and
Frank McLaughlin.
By Edward N. Pagelsen
Attorney

UNITED STATES PATENT OFFICE.

CHARLES A. WHITE AND FRANK McLAUGHLIN, OF LONDON, ONTARIO, CANADA.

RESILIENT HUB FOR WHEELS.

1,040,599.   Specification of Letters Patent.   Patented Oct. 8, 1912.

Application filed March 9, 1912. Serial No. 682,694.

*To all whom it may concern:*

Be it known that we, CHARLES A. WHITE and FRANK McLAUGHLIN, citizens of the Dominion of Canada, and residents of London, in the county of Middlesex and Province of Ontario, Canada, have invented a new and Improved Resilient Hub for Wheels, of which the following is a specification.

This invention relates to the hubs of wheels of automobiles, traction engines, railway cars for both passenger and freight service, and other vehicles, and its object is to provide means for resiliently mounting the hub in such a manner that it will be radially movable in any direction, and will be prevented from moving longitudinally of the wheel.

A further object of this invention is to provide a driving member which is secured to the shaft, and resilient connections between the driving member and the wheel.

Figure 2:
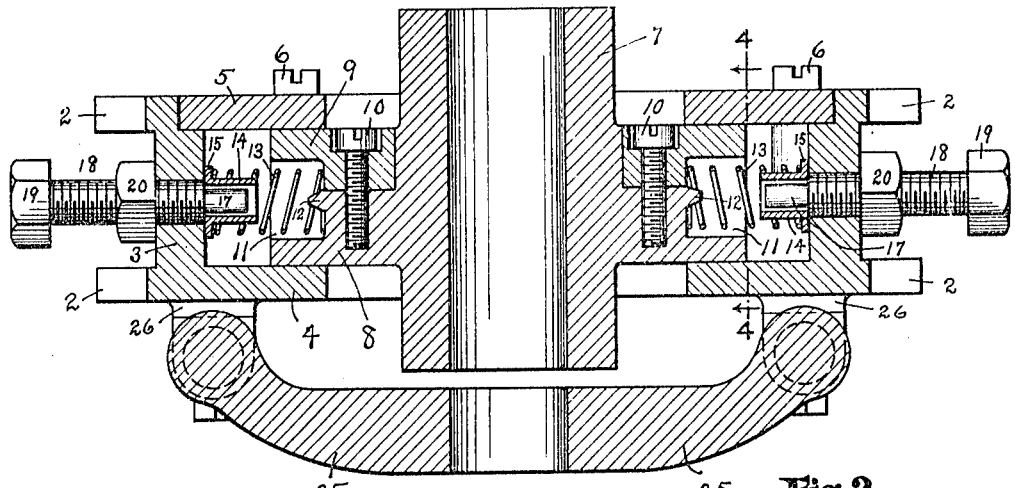
Figure 6:
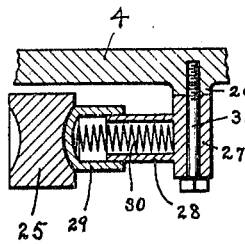
Figure 5:
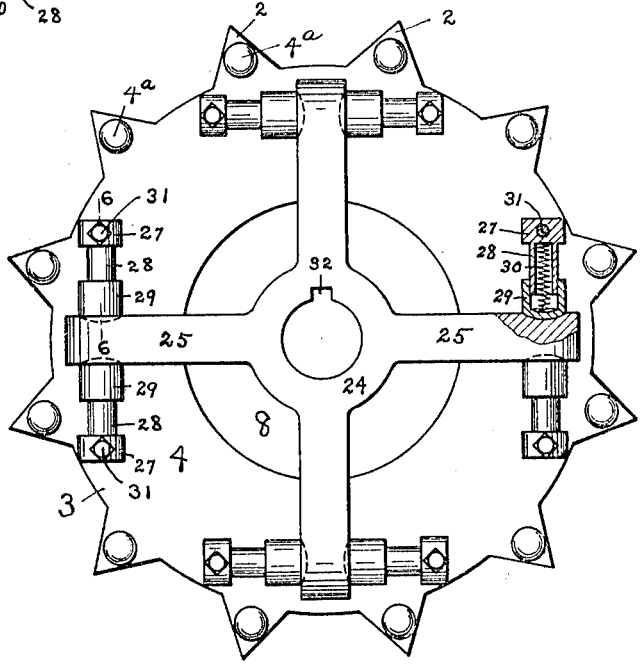

In the accompanying drawing, Figure 1 is an elevation of the central ring or drum of a wheel and the hub. Fig. 2 is a section on the line 2—2 of Fig. 1. Fig. 3 is a section on the line 3—3 of Fig. 1. Fig. 4 is a section on the line 4—4 of Fig. 2. Fig. 5 is an elevation of this construction on the opposite side from Fig. 1 on a smaller scale a portion being shown in section. Fig. 6 is a section on the line 6—6 of Fig. 5.

Similar reference characters refer to like parts throughout the several views.

This invention consists in connection with a ring or drum formed with sockets to receive the inner ends of the spokes, of a hub mounted on the shaft and revoluble thereon to a certain, limited, predetermined extent, of springs mounted between the hub and the outer drum for normally holding the hub in substantially central position, but adapted to yield when any extraordinary stress is placed upon them by reason of sudden jolts or jars, of a driving member having a series of arms extending toward the outer ring or drum, and resilient members mounted on the drum and engaging these arms, whereby the wheel may be revolved.

While the construction shown in the drawings is intended to be used with wheels having non-elastic rims, it will be apparent that it is not limited thereto, but may be employed on wheels having pneumatic tires. The construction of the rim and the spokes forms no part in this invention and they are therefore substantially omitted from the drawings, only the inner ends of the spokes being shown in Fig. 1. These spokes 1 are securely held between the projections 2 of the outer ring or drum 3 as shown in Figs. 1 and 3, rivets 4ª being employed to secure the ends of the spokes to the drum if desired. This drum has an inwardly extending flange 4, and to the drum is secured the ring 5 by means of the screws 6.

The hub 7 is adapted to be mounted on the shaft or axle. It has a web formed of an integral portion 8 and removable ring 9, which ring may be secured by the screws 10. Pockets 11 are formed at intervals in the periphery of the web, and projections 12 at the bottoms of the pockets constitute centers for the springs 13. The opposite ends of the springs embrace the thimbles 14, having flanges 15, against which the springs abut. These thimbles are held in position by means of the reduced ends 17 of the screws 18, which screws have heads 19 and jam-nuts 20. As shown in the drawings, these screws 18 are threaded in the drum 3. As shown in Fig. 4, the pockets 11 are round at the bottom but are elongated near the face of the web so that the springs may swing circumferentially of the web on the projections 12 as centers.

The wheel is driven by means of a separate driving member secured to the shaft, consisting of the hub 24 and arms 25. At intervals around the face of the flange 4 are formed the lugs 26, on which are pivoted the heads 27 on the outer ends of the sleeves 28. Within these sleeves 28 and the thimbles 29 are the springs 30. The thimbles are slidable on these sleeves. The pivots 31 for these sleeves may be of any desired construction. The hub 24 will preferably be secured to the shaft by means of a key, which may extend into the key-seat 32. The operation of this device is as follows.

After the parts are properly prepared, the rings 5 and 9 being removed, the springs 13 are inserted by placing their inner ends over the short pins 12, and slipping the thimbles 14 into their outer ends, and then compressing these springs until these thimbles may be slipped down into the position shown in Fig. 2. The screws 18 are then introduced sufficiently far to hold the thimbles 14 in position. The rings 9 and 5 are then secured in position by means of the screws 10 and 6 respectively. It will be seen that any broken spring can be quickly replaced without removing the wheel, by merely taking off the rings 5 and 9, which exposes these springs.

It may be necessary to provide means to turn the hub 7, which may be easily accomplished by forming a keyway 34 in this hub so that should the hub lag behind the wheel to such extent as to endanger springs 13, a key in the shaft will immediately pick up the hub and revolve it. Because of the width of this key-seat, there is no danger of binding when the hub moves radial within the shell. The flange 4 and ring 5 of the drum are so spaced that the web of the hub may move freely between them, but will be prevented from moving longitudially of the shaft.

We claim—

1. In a vehicle wheel, the combination of a drum formed with projections to position the inner ends of the spokes and with inwardly extending rings, a hub having a radial web extending between said rings said web having a series of pockets in its periphery, springs mounted in pockets in said web and engaging the inner face of the drum, sleeves pivoted on said drum in pairs at their outer ends, thimbles slidable on the free ends of the sleeves, springs within the sleeves and thimbles, a driving member concentric with the hub and having arms, each ending between and engaged by a pair of said thimbles.

2. In a vehicle wheel, the combination of a drum formed with inwardly extending rings, a hub having a flange extending between said rings, springs mounted between the hub and drum, sleeves pivoted on said drum in pairs at their outer ends, thimbles slidable on the free ends of the sleeves, springs within the sleeves and thimbles, and a driving member having arms extending between and each engaged by a pair of said thimbles.

In testimony whereof we have signed this specification in the presence of two subscribing witnesses.

CHAS. A. WHITE.
FRANK McLAUGHLIN.

Witnesses:
HELEN E. ANDERSON,
EDGAR MORDEN.

Copies of this patent may be obtained for five cents each, by addressing the "Commissioner of Patents, Washington, D. C."